United States Patent [19]

Gerhardt

[11] Patent Number: 4,480,978

[45] Date of Patent: Nov. 6, 1984

[54] PRESS FOR THE PRODUCTION OF PRESSEDBOARD

[75] Inventor: Klaus Gerhardt, Rheurdt, Fed. Rep. of Germany

[73] Assignee: G. Siempelkamp GmbH & Co., Krefeld, Fed. Rep. of Germany

[21] Appl. No.: 378,255

[22] Filed: May 14, 1982

[51] Int. Cl.[3] .......... A23G 1/20

[52] U.S. Cl. .......... 425/371

[58] Field of Search .......... 425/371

[56] References Cited

U.S. PATENT DOCUMENTS 3,883,284 5/1975 De Mets .......... 425/371

3,883,285 5/1975 De Mets .......... 425/371

3,942,929 3/1976 De Mets .......... 425/371

3,945,789 3/1976 Boman .......... 425/371

*Primary Examiner*—James R. Hall

*Attorney, Agent, or Firm*—Karl F. Ross; Herbert Dubno

[57] ABSTRACT

A press for compacting comminuted material in the manufacture of pressedboard comprising a pair of steel pressing bands which are backed up in the pressing zone by roller bodies on endless chains carried through this zone between respective press platens and the bands. The chains have links which are folded into a zigzag configuration as they enter the zone and are drawn out into an extended configuration outside the zone.

6 Claims, 8 Drawing Figures

5
6
7
7
22
24
23
23
22
24
25
25
1
3
2
18
16
17
16
18
13
9
13

PRESS FOR THE PRODUCTION OF PRESSEDBOARD

FIELD OF THE INVENTION

My present invention relates to the production of pressedboard and, more particularly, to an apparatus for the pressing of a layer of mat or comminuted material, with or without an externally supplied binder to produce pressedboard.

BACKGROUND OF THE INVENTION

Pressedboard, frequently referred to also as fiberboard or particleboard, is generally formed by hot pressing a mat or web of a comminuted material. This material may contain a thermally activatable intrinsic binder or which may be admixed with a thermally activatable binder to produce a relatively rigid product which can range from extremely high density structural board to comparatively low density porous board which can be used, for example, for insulation.

The art has recognized a wide variety of materials for the production of pressedboard. Typical materials are sawdust and wood chips for the production of particleboard, wood fibers or other cellulosic fibers in the production of fiberboard.

The hot pressed product may be used directly or may form a core between layers or have layers applied to one surface thereof in order to face the board and/or provide patterns thereof, or to improve the surface quality of the board.

Frequently, during the fabricating process, the board will be embossed and various contours will be imparted to the finished product.

The synthetic resin binders which can be used are generally those which are considered thermosetting, e.g. phenol-formaldehyde, melamine, urea and resorcinal resins.

Much of the technology in the field involves the use of conveyors on which the layers of comminuted material are formed, means for subdividing such layers into mats, and platen presses operated with or without mat-carrying trays for the pressing and handling of mats and board. However, the production of a continuous strip of the comminuted material has received considerable interest because of its utility in the production of a pressedboard.

It is known, for example, to form such a strip by feeding the comminuted materials upon a conveyor surface between a pair of platens.

In a more or less continuous process, the layers can be received between a pair of continuous steel belts, namely an upper pressing belt and a lower pressing belt, circulated between the platens and therefore receiving the layer between them as they meet to transport the layer between the platens.

When pressboard is to be formed by thermally activating the binder between these platens, the platens may be heated. Of course, it is also possible to use this system as a preliminary press and to thermally activate the binder downstream of the press to form the board.

In either case, the surfaces engaged by the layers are those of the steel bands and the steel bands are pressed against the rigid surfaces of the platen by rollers, rods or bars, which are circulated through the gaps between the steel bands and the platens.

The circulation of these pressing bars, which are hereinafter referred to as roller bars, can be effected by a relatively complex mechanism of the type described, for example, in German application 22 15 618.

The circulating means of this arrangement include guide rails which define the circulating path for the bars and which engage the ends thereof. Within the gap between the pressing band and the platen, at least, the movement of the roller bars is accomplished with one bar pressing against the next. This is, in a sense, a passive roller transport system since the impetus for movement of the rollers is drawn from the displacement of the steel belt. A plunger arrangement or the like can be provided to introduce the rollers into the gap between the steel belt and the platen.

This system has some highly significant disadvantages. Firstly, canting of the roller bars is unavoidable, there being a tendency from time to time for one end of a bar to lead or trail the opposite end thereof. This can result in jamming and interruption of the movement of the rollers through the gap. In practice, such jamming damages the rollers as well as the band and distorts the product. The downtime of the machine necessary to clear the jam is also associated with the need to dispose of a defective portion of the product and, indeed, to replace damaged parts.

Another disadvantage is the comparatively high friction which is generated as the rollers rub upon one another.

It is also a disadvantage that, upon the development of play in the guide system, there is a tendency for upstream rollers to jump over rollers which are further downstream.

It might be thought that the problem could be resolved by coupling the rollers or bars together in a chain, i.e. by providing common tractive means for drawing the rollers through the gap. This would provide an active transport of the rollers. Experience with such systems, however, has shown that this introduces additional stress factors in the pressing zone which increase the tendency to friction, corrosion, slip and the like, all of which render the system impractical.

OBJECTS OF THE INVENTION

It is the principal object of the present invention to provide an improved pressing system for comminuted material especially for the production of pressedboard, whereby the disadvantages of earlier systems can be obviated.

Another object of this invention is to provide a steel belt press of the type described, i.e. wherein roller bodies are introduced between steel bands and respective press platens, to compress a comminuted mass between these bands.

Still another object of the invention is to provide, for a press of the aforedescribed type, improved means affording active transport of the roller bodies or bars without creating the additional stresses mentioned above.

SUMMARY OF THE INVENTION

These objects and others which will become apparent hereinafter are attained, in accordance with the invention, by providing a roller bar circulating device comprising a pair of synchronously operating chains passing over chain-guiding rollers and formed with links which, at least in the region of the gap between each pressed band or belt and the respective platens, form a zigzag configuration with the pivots between these links serving as axes for the rollers. The zigzag assembly, whereby the links are compacted in the longitudinal direction, thus provides a set of roller bars turned toward the band and which press the band against the comminuted material. Another set or rollers is formed by the zigzag assembly remote from the band and engaging a guiding surface extending along the path of the band.

The rollers are journalled along axes which may form the link-joint pivot axes as well.

While reference has been made herein to links in the conventional chain sense, it should be noted that those links may be any structure rigidly connected with two pivot axes, including plates, shackles, hinge flaps, or the like.

With this system of the invention, therefore, the continuous chain effectively compresses the roller assembly as it enters the pressing region by folding the links into the zig-zag array. The chain is drawn out after the roller bars leave the gap between the pressing band and the platen and being folded again into the zigzag pattern as, or just before, the roller bars are returned to the gap.

The extended or drawnout chain thus acts as a means for drawing the roller bars around the various deflecting wheels defining the endless path of the chain and for feeding the roller bars, once the links have been refolded into the zigzag pattern, back into the pressing region.

The invention is based upon my discovery that the aforementioned system allows the rollers and roller bar to be displaced effectively along the closed transport path and fed to the pressing region without any danger of dislocating or binding, since the positions of the roller bars which are disposed between the platen and the band are positively determined by the zigzag link assembly.

Forces upon the roller bars tend to be redistributed through the link assembly because each roller bar bearing upon the band is connected by at least two pairs of rigid links, having an articulation between them, with the rollers fore and aft thereof, the articulations themselves being guided. The freedom or play for compensation is afforded by reasons of the fact that the angles included between the links at each pivot can vary and the roller bars can shift axially at least limitedly.

According to a feature of the invention, therefore, two sets of rollers are provided, one set (termed roller bars) directly engaging the band as being interposed between the band and a pressing or supporting surface, e.g. the surface of the platen associated with the band.

The other set of rollers, held away from the respective bands by the links and rotatable about axes disposed at the articulations between two pairs of links connected to adjacent support rollers, are referred to hereinafter as guide rollers.

According to the invention, these guide rollers in the region of the press can ride along or against guide rails or bars preferably disposed adjacent the press platens or plates.

One or more of the deflecting wheels about which the chains pass to form an endless path for the respective chain, can be provided with notches, pockets or other formations at a spacing corresponding to the roller spacing along the chain.

At least one of these wheels or sets of wheels can be provided with a feed wheel, also formed with notches or pockets and disposed and rotated so as to impart the zigzag configuration to the assembly of rollers. This feed wheel can cooperate with the guide bars of rails which, as has already been indicated, are provided at least in the region in which the zig-zag assembly is formed for introduction into the pressing region.

The inlet side of the pressing region can be provided with additional pressing means having one or more endless roller chains which can be spaced apart over the width of the steel sheet metal pressing band and which provide support for additional backup force for the rollers which bear against the band. These backup rollers can also include rollers between which the pressing rollers can be received (cradled) or can nest.

BRIEF DESCRIPTION OF THE DRAWING

The above and other objects, features and advantages of the present invention will become more readily apparent from the following description, reference being made to the accompanying drawing in which.

SPECIFIC DESCRIPTION

The device shown in FIG. 1 for the production of pressedboard, especially particleboard or fiberboard, comprising a pair of endless steel bands 2 and 3, hereinafter referred to as pressing bands, which are displaced by a drive not shown on suitable deflecting rollers or drums which also have not been illustrated here, to carry a binder-containing layer of particles or fibers adapted to be thermally activated and pressed to produce pressedboard. This layer has been shown at 1 and is fed onto the lower band 3 by a feeder for such particles capable of providing a highly homogeneous and uniform deposit.

The bands 2 and 3 carry the comminuted material between a pair of press platens 5 and 6 mounted upon a frame 4. The bands are displaced by one or more drums about which the bands pass.

Figure 1:
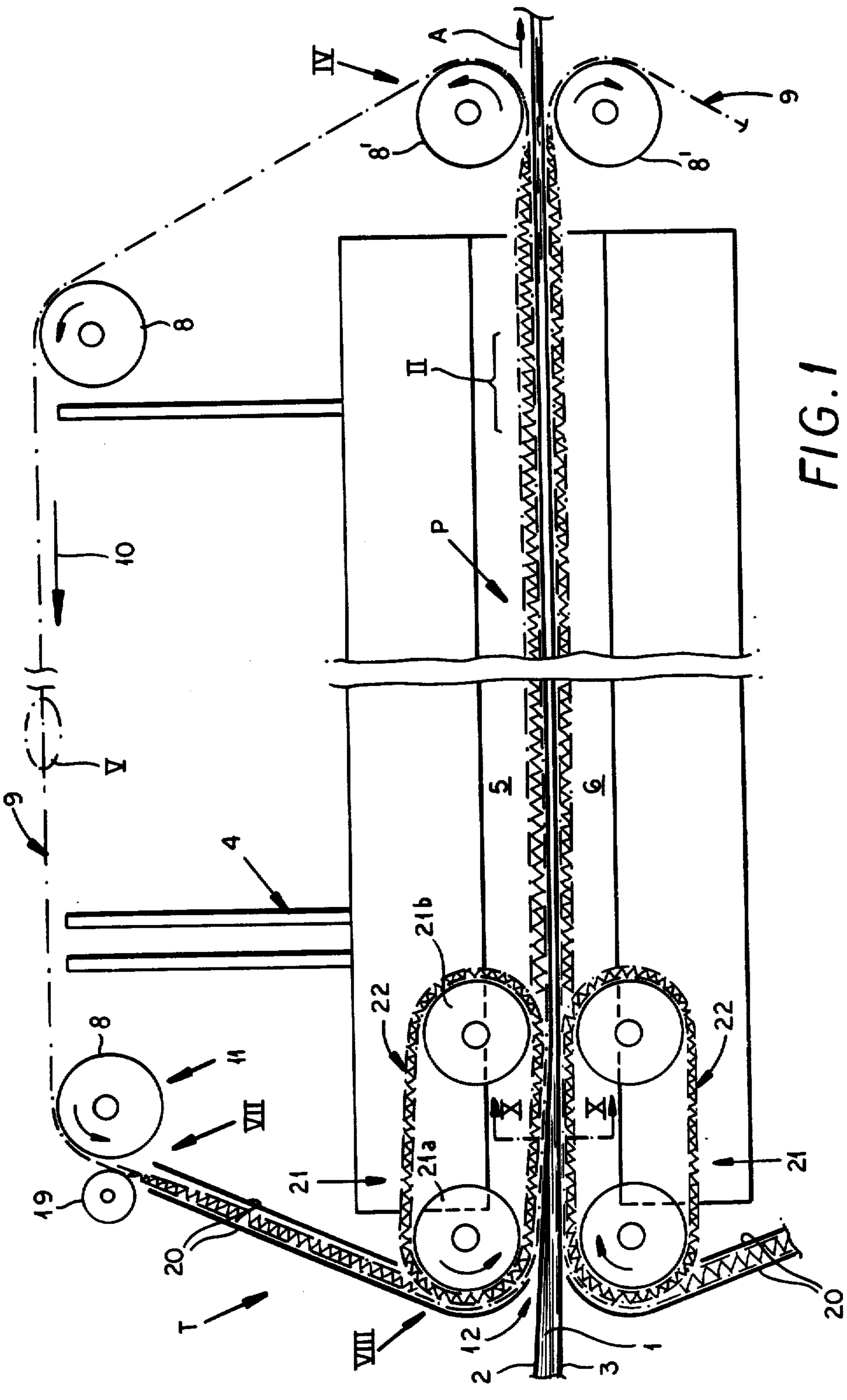
FIG. 1 is a schematic side elevational view illustrating the principles of the present invention as applied to the pressing of a continuous mat of fiber or particles adapted to form pressedboard.
Figure 2:
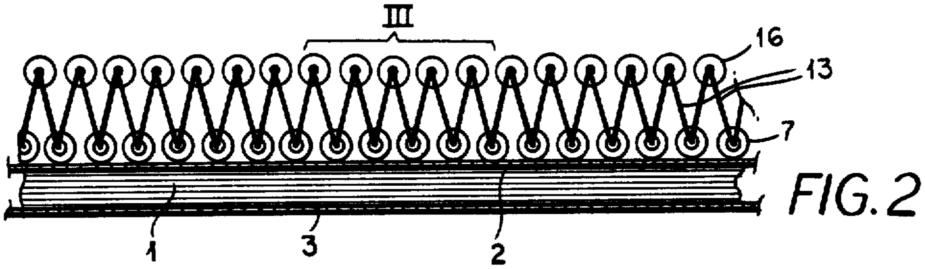
FIG. 2 is an enlarged detailed view of the region II of FIG. 1.

As can be seen from FIG. 1 generally and from the other FIGURES in somewhat more detail, in the pressing region between the press platens 5 and 6 and the respective steel bands 2 and 3, supports are provided for the steel bands in the form of roller bars 7 which bridge the gaps between these platens and the respective bands and which support the bands against the outward reaction forces generated by drawing the bands and the comminuted material between the press platens.

The roller bars 7 are displaced along an endless path 10 via a displacement means represented by wheels 8 over which the respective chains can pass. The wheels 8 analogous to sprocket wheels can be provided with spaced-apart formations along their peripheries, which engage the chain.

Figure 7:
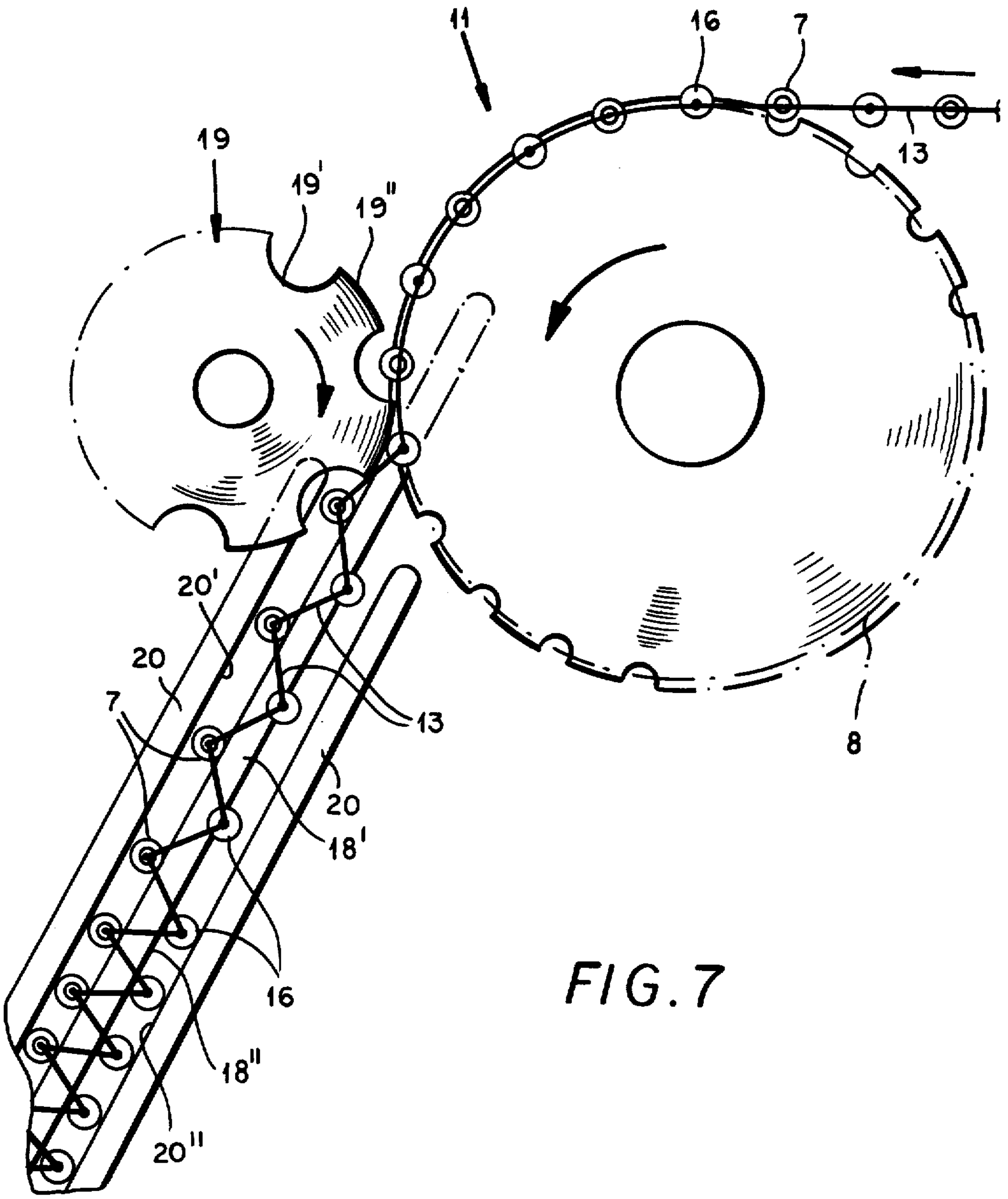
FIG. 7 is a detail of the region VII of FIG. 1.

Between the bands 2 and 3 and the respective platens 5, 6, at the upstream side of the press, feeder 11 can be provided for feeding the roller bars 7 into the gaps between the bands and the platens. Such means, in accordance with this invention, will be described in greater detail in connection with FIG. 7.

The synchronously operating chains 9, which pass around the wheels 8 and form the roller displacing means (see especially FIGS. 2, 3, 5 and 6), have rigid links 13 which are stretched out over the endless path outside the pressing region and within the pressing region P are shoved together in a zigzag configuration so as to have articulations 14 turned toward the respective pressing bands and articulations 15 spaced away from these bands.

Figure 6:
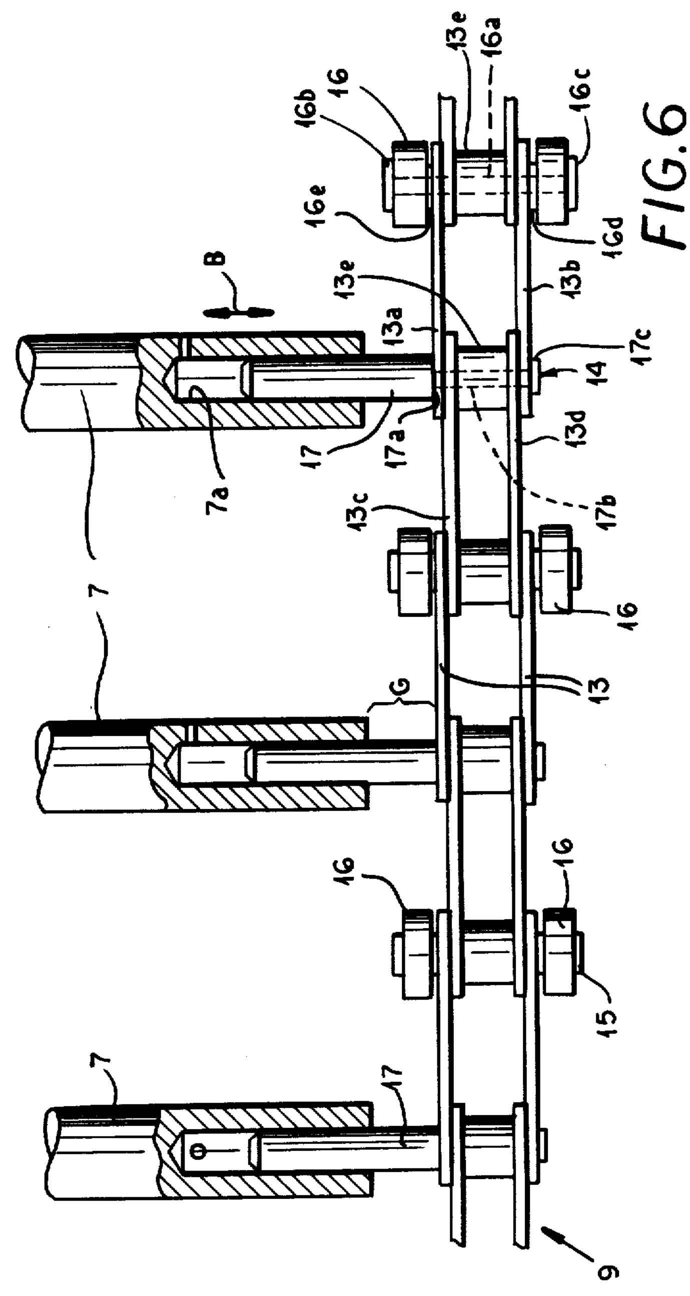
FIG. 6 is a partial plan view, partly broken away, of the chain shown in FIG. 5.

As can be seen from FIG. 6, each articulation 14 can be formed by a pintle 17 which the link plates 13*a* and 13*b* together forming an outer link 13 with a pair of link plates 13*c* and 13*d* forming an inner link, the members being held apart by a spacer sleeve 13*e* which can be fixed to the link plates 13*c* and 13*d*.

Concurrently, each link is formed by a pair of parallel plates and alternate links or outer links whose plates flank the inner links. The inner links, in turn, have their plates 13*c* and 13*d* held together but in spaced apart relationship by the sleeves 13*e*.

The means for preventing axial movement of the pintles 17 has not been shown in detail but can be a shoulder 17*a* at one end of a shank 17*b* provided with a rivet head 17*c*.

The pintles 17 can alternate with pintles 16*a* upon which guide rollers 16 are rotatably mounted, the pintles 16*a* having riveted heads 16*b* and 16*c* outwardly of these rollers and being threaded through these rollers, the sleeve 13*e* of a respective inner link plate, the outer link plates 13*a* and 13*b*, and washers 16*d* and 16*e*.

The rollers 16 thus lie proximal to the chain while the roller bars 7, which are rotatably mounted on the pintles 17, extend athwart the band over the full width thereof, but are spaced from the chain so as to define a gap G therewith (FIG. 6) in which a guide rail can be disposed without interfering with the roller bars 7.

While the roller bars 7 are shown to be directly mounted upon the pintle 17 and the rollers 16 to be directly mounted upon the pintles 16*a*, it will be appreciated that roller bearings can be provided between the rollers and the respective pintles.

The axes of the pintles 17, of course, define the articulations 14 between adjacent links while the axes of the pintles 16 form the articulations 15 previously mentioned.

The wheels 8 can be driven synchronously by means not shown to synchronously entrain the chains 9 along their respective circulating paths, one of which has been shown at 10.

These paths 10 extend upstream of the pressing stretch P and thereby urge the link plates into the zigzag configuration between the guide rails 20, assisted by a feed roller 19 so that the zigzag configuration commences before the chain enters the pressing stretch and, with the wheels 8 at the downstream side of the pressing stretch, the chain is drawn out again into its stretched condition whereby the links are end to end.

Figure 10:
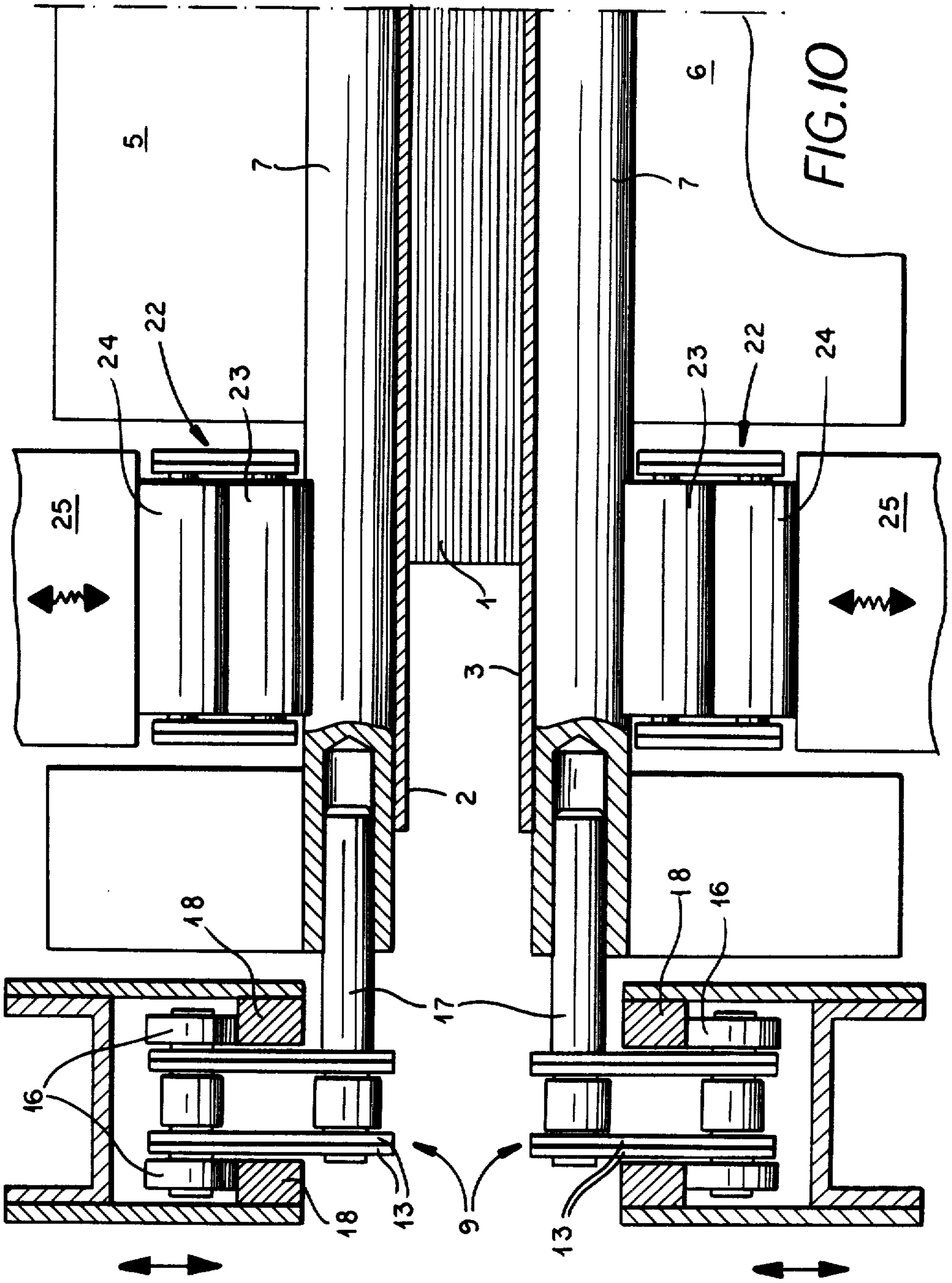
FIG. 10 is a section taken along the line X—X of FIG. 1.

As can be seen from FIGS. 6 and 10, the roller bars 7 are urged toward one another, i.e. are brought closer together in forming the zigzag configuration and thus are arranged along the side of the assembly which bears against the pressing band while the rollers 16 are brought closer together and are arranged along a guide rail 18.

Figure 3:
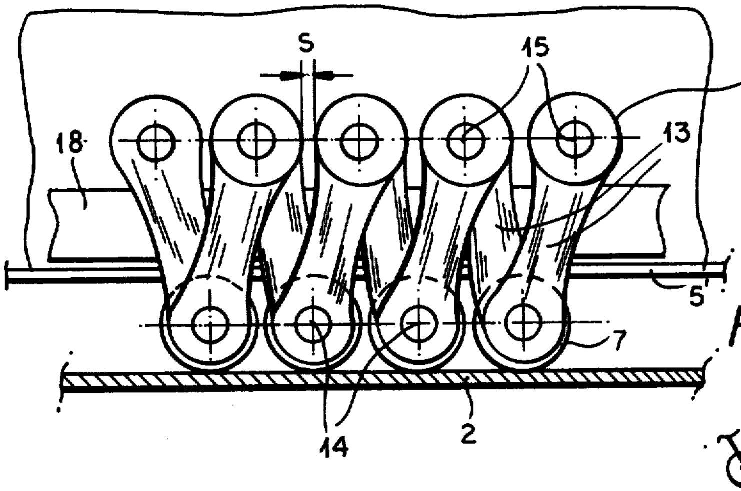
FIG. 3 is a detailed view to an even larger scale of the region III of FIG. 2, parts being shown less diagrammatically in FIG. 3.
Figure 4:
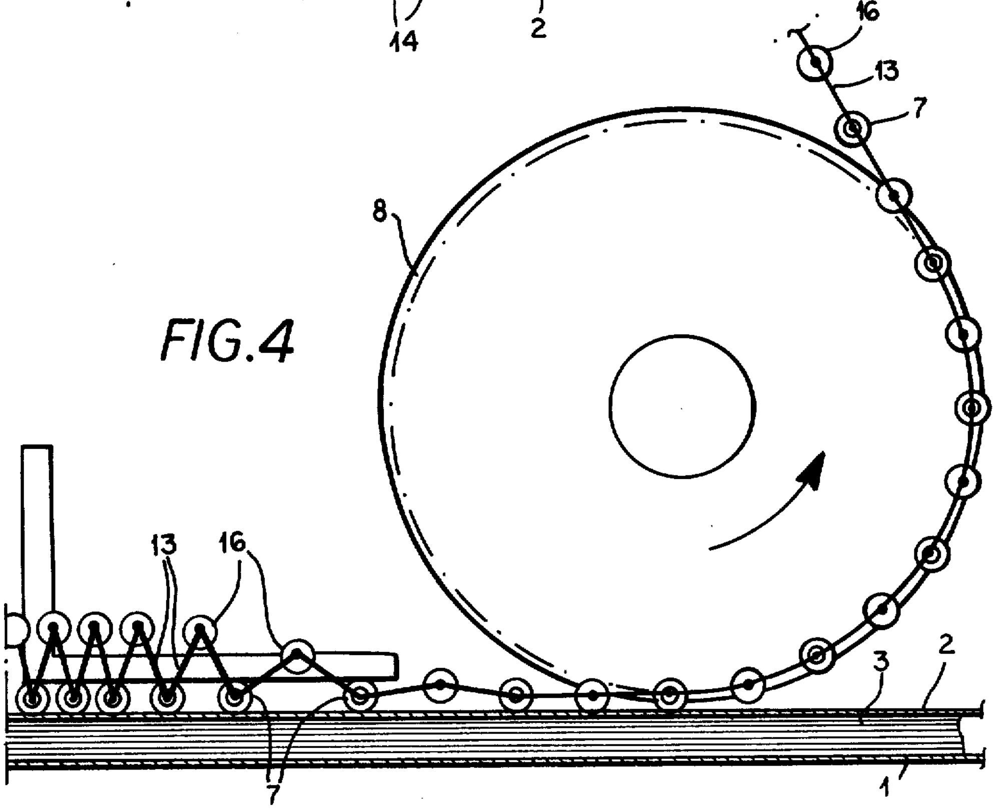
FIG. 4 is an enlarged view of the region IV of FIG. 1.
Figure 5:
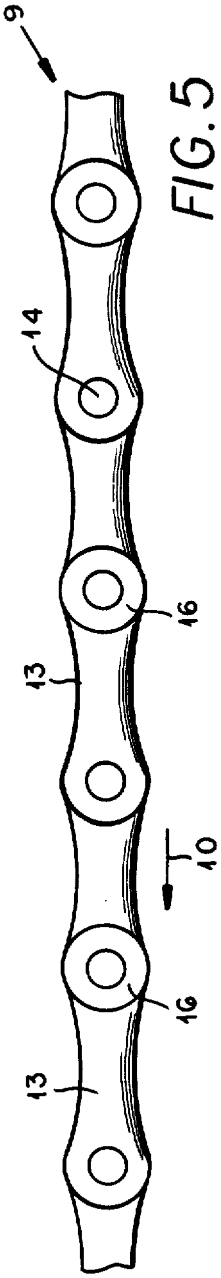
FIG. 5 is an enlarged view of the region V of FIG. 1.

The zigzag configuration provides, as can be seen from FIG. 3, a degree of freedom S between the rollers. This degree of freedom allows the angles formed by the link to vary as may be necessary while nevertheless assuring positive guidance of all of the roller bars 7 which are pressed by the surface 5', for example, against the pressing band 2.

In the constructions shown and in the preferred or best mode embodiment of the invention, the feeder 11 which forms the zigzag configuration of the chains (see FIG. 7) comprises one of the sprocket wheels 8 and a further sprocket wheel 19 cooperating with the wheel 8 and moving at a greater angular velocity to receive, with pockets 19', the roller bars 7 and thereby guide them between the rail surface 20' and a guide bar 18'. Between the pockets 19', the radial arms 19'' press the rollers 16 in the opposite direction so that these rollers come to ride upon the surface 18'' of the bar 18' and between this surface 18'' and a surface 20'' of the opposite guide rails 20.

The upstream side of the pressing region P is provided with an inlet press of the continuous conveyor type as represented at 21.

Figures 8, 9:
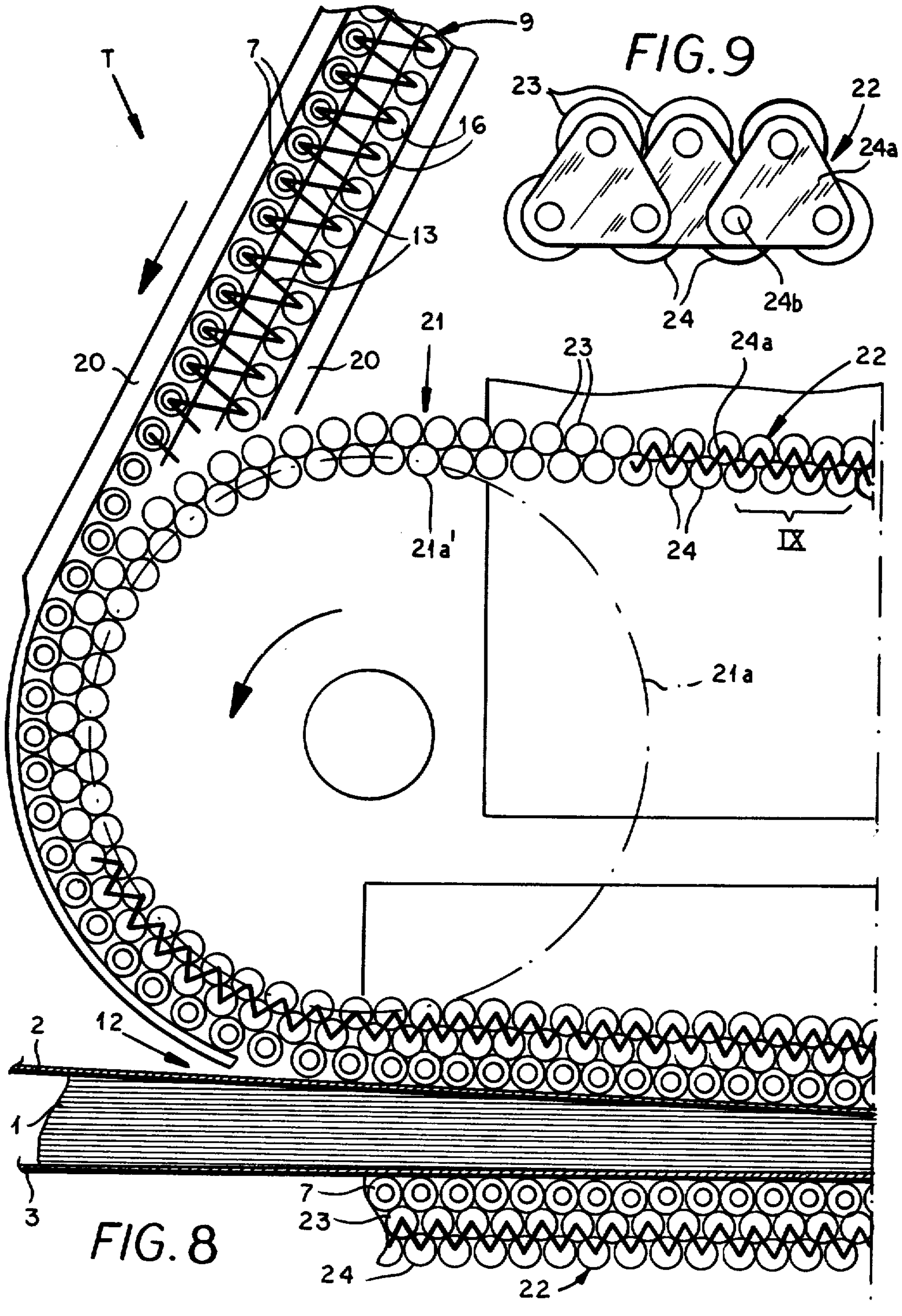
FIG. 8 is a somewhat diagrammatic detailed view of the region VIII of FIG. 1, also drawn to a larger scale.
FIG. 9 is an enlarged detailed view of the region IX of FIG. 8.

The configuration of this inlet press has been shown in somewhat greater detail in FIGS. 8–10. The inlet press 21 comprises a pair of deflecting rollers 21*a* and 21*b* for each of the upper and lower press members, at least one of these deflecting members or sprocket wheels being synchronously driven with the respective chain 9.

Passing over the sprockets 21*a* and 21*b* is a chain which is formed by rollers 23 and 24 rigidly interconnected at their axes by link 24*a* (see FIG. 9), the links having articulations 24*b* coinciding with the axes of the inner rollers 24. The inner rollers 24 engage in pocket 21*a'* of the sprocket 21*a*, 21*b*, while the outer rollers 23 are positioned so that two of them cradle a respective roller bar 7 as they entrain the roller bars through the inlet portion of the pressing stage. As can be seen from FIG. 8, the two belts 22 converge toward one another in the direction A of movement of the material and thus press the material to high pressure into the compact layers forming the pressedboard when this material is carried into the region of the heated platen 5 and 6.

The rollers 23 of the chains 22 thus form bearing rollers for the members which actually urge the press bands toward one another.

The inlet press 21 also has the advantage of precisely spacing apart the roller bars 7 as they are fed into the respective gaps between the pressing bands and the platens in the inlet T.

The sprockets 8' are driven with a prevalent speed greater than the speed with which the sprocket 8 at the feeder 11 is driven but synchronously therewith to provide the drawnout stretch of chain 9 outside of the pressing zone P and the compacted or zigzag stretch within the pressing and the inlet zones.

It has also been found that the roller bars 7 are not cooled significantly over the stretched portion of the path so that they retain a large amount of heat picked up in the pressing region. Of course, any heat radiation from these rollers can be further reduced by providing a hood or insulated chamber within which the apparatus is received.

In the pressing region P, the platens 5 and 6 can be continuously heated and, since the apparatus is continuously driven, the system continuously produces pressedboard which may be cut into lengths or width downstream of the press.

As can be seen from FIG. 6, the roller bars 7 have axial bores *7a* which receive the pintles 17 with at least limited freedom of axial movement in the direction of arrow B, this freedom of axial shifting movement, coupled with the play S, and the otherwise fixed positioning of the roller bars prevents binding and as the bars are displaced through the pressing zone. The inner rollers 24 engage in pocket *21a'* of the sprocket *21a*, *21b*, while the outer rollers 23 are positioned so that two of them cradle a respective band support roller 7 as they entrain the band support rollers through the inlet portion of the pressing stage. As can be seen from FIG. 8, the two belts 22 converge toward one another in the direction A of movement of the material and thus press the material to high pressure into the compact layers forming the pressedboard when this material is carried into the region of the heated platen 5 and 6.

The rollers 23 of the chains 22 thus form bearing rollers for the members which actually urge the press bands toward one another.

The inlet press 21 also has the advantage of precisely spacing apart at rollers 7 as they are fed into the respective gaps between the pressing bands and the platens in the inlet T.

The sprockets 8' are driven with a prevalent speed greater than the speed with which the sprocket 8 at the inlet 11 is driven but synchronously therewith to provide the drawnout stretch of chain 9 outside of the pressing zone P and the compacted or zigzag stretch within the pressing and inlet zones.

It has also been found that the rollers 7 are not cooled significantly over the stretched portion of the path so that they retain a large amount of heat picked up in the pressing region. Of course, any heat radiation from these rollers can be further reduced by providing a hood or insulated chamber within which the apparatus is received.

In the pressing region P, the platens 5 and 6 can be continuously heated and, since the apparatus is continuously driven, the system continuously produces pressedboard which may be cut into lengths or widths dowstream of the press.

As can be seen from FIG. 6, the roller bars 7 have axial bores *7a* which receive the pintles 17 with at least limited freedom of axial movement in the direction of arrow B, this freedom of axial shifting movement, coupled with the play S, and the otherwise fixed positioning of the roller bars prevents binding and as the bars are displaced through the pressing zone.

I claim:

1. An apparatus for the pressing of a continuous layer of a comminuted material and binder to be consolidated in the production of pressedboard, comprising:

a pair of endless bands having juxtaposed portions for conveying said layer through a pressing zone, said layer entering said pressing zone between said bands at an upstream end and leaving said pressing zone at a downstream end;

respective support surfaces juxtaposed spacedly with said bands respectively on sides thereof opposite said layer along said pressing zone along said portions;

a pair of endless chains, each formed with a succession of links joined at articulations and provided with roller bars at alternate articulations along the respective chains, said roller bars being receivable between the respective support surface and band for pressing said material through the respective bands; and means for imparting a zigzag displacement of the links of said chains where said roller bars move through said pressing zone and drawing said links out into an extended pattern outside said roller zone.

2. The apparatus defined in claim 1 wherein each of said chains is provided with guide rollers at articulations alternating with the articulations of said roller bars, said guide rollers being turned away from the respective bands in said zone, said apparatus further comprising guide rails at least in said zone engaging said guide rollers for maintaining the zigzag configuration of said links through said zone.

3. The apparatus defined in claim 2 wherein said chains and said bands are synchronously driven and said roller bars are mounted with at least limited freedom of axial displacement on respective pintles connected to said links and form said alternate articulation thereof.

4. The apparatus defined in claim 3 wherein said guide rails run along said side surface and said surfaces are formed by heated press platens.

5. The apparatus defined in claim 1, further comprising a wheel for each of said chains upstream of said zone, and a pocketed side wheel juxtaposed and cooperating with said sprocket wheel for forming the respective chains into a zigzag configuration at a region upstream of said zone.

6. The apparatus defined in either of claim 1, claim 2, claim 3, claim 4, claim 5, further comprising an inlet press at an upstream portion of said zone and comprising an endless roller track having pairs of rollers cradling said roller bars as said rollers bars enter said zone to compact said material.

* * * * *

UNITED STATES PATENT AND TRADEMARK OFFICE

CERTIFICATE OF CORRECTION

PATENT NO. : 4,480,978

DATED : 6 November 1984

INVENTOR(S) : Klaus Gerhardt

It is certified that error appears in the above-identified patent and that said Letters Patent is hereby corrected as shown below:

In the heading, left column, insert item [30] to read:

-- Foreign Application Priority Date

16 May 1981 West Germany, No. P 31 19 529.6. --

Signed and Sealed this

*Twelfth* Day of *March 1985*

[SEAL]

*Attest:*

DONALD J. QUIGG

*Attesting Officer* *Acting Commissioner of Patents and Trademarks*